(12) United States Patent
Marchal et al.

(10) Patent No.: US 10,456,877 B2
(45) Date of Patent: Oct. 29, 2019

(54) METHOD AND SYSTEM FOR CUTTING A PREFORM INTENDED FOR THE PRODUCTION OF A TURBOMACHINE PART

(71) Applicant: SAFRAN AIRCRAFT ENGINES, Paris (FR)

(72) Inventors: Yann Marchal, Melun (FR); Philippe Marolle, Wissous (FR); Claire Rousseau, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/018,938

(22) Filed: Jun. 26, 2018

(65) Prior Publication Data
US 2018/0304421 A1  Oct. 25, 2018

Related U.S. Application Data (63) Continuation of application No. 14/414,772, filed as application No. PCT/FR2013/051558 on Jul. 2, 2013, now Pat. No. 10,035,226.

(51) Int. Cl.
*B23P 15/02* (2006.01)
*B29B 11/16* (2006.01)
*F01D 5/28* (2006.01)

(52) U.S. Cl.
CPC .............. *B23P 15/02* (2013.01); *B29B 11/16* (2013.01); *F01D 5/282* (2013.01);
(Continued)

(58) Field of Classification Search
CPC .......... B23P 15/02; B29B 11/16; F01D 5/282
See application file for complete search history.

(56) References Cited

U.S. PATENT DOCUMENTS

| | | |
|---|---|---|
| 2005/0084377 A1 | 4/2005 | Dambrine |
| 2005/0250291 A1 | 11/2005 | Baluswamy |
| (Continued) | | |

FOREIGN PATENT DOCUMENTS

| | | |
|---|---|---|
| EP | 1 526 285 A1 | 4/2005 |
| EP | 1 777 063 A1 | 4/2007 |
| (Continued) | | |

OTHER PUBLICATIONS

International Search Report issued in PCT/FR2013/051558 dated Jan. 3, 2014 (w/ English Translation of Category of Cited Documents).
(Continued)

*Primary Examiner* — Moshe Wilensky
(74) *Attorney, Agent, or Firm* — Oblon, McClelland, Maier & Neustadt, L.L.P.

(57) ABSTRACT

A method for cutting a preform usable for production of a turbomachine part and including a weaving of a plurality of threads, the threads including single threads that are visually identifiable, along a cutting contour calculated based on a preform model in which the threads have a reference arrangement, the method including: taking an image of the preform; processing the image to determine a deviation in an arrangement of the threads which are visually identifiable relative to the reference layout; correcting the cutting contour according to the deviation; and cutting the preform along the corrected cutting contour.

9 Claims, 4 Drawing Sheets

(52) U.S. Cl.
CPC .... *Y10T 29/49332* (2015.01); *Y10T 29/49995* (2015.01); *Y10T 83/141* (2015.04)

(56) References Cited

U.S. PATENT DOCUMENTS

| | | |
|---|---|---|
| 2006/0257260 A1 | 11/2006 | Dambrine |
| 2007/0092379 A1 | 4/2007 | Coupe |
| 2007/0284216 A1 | 12/2007 | Meier |
| 2010/0135760 A1 | 6/2010 | Hjornet |
| 2010/0173137 A1* | 7/2010 | Kismir .................. B26D 5/007 428/196 |
| 2011/0248416 A1 | 10/2011 | Mahieu |
| 2013/0340926 A1 | 12/2013 | Liang |
| 2015/0341600 A1 | 11/2015 | Hatcher |
| 2016/0018587 A1 | 1/2016 | Koraishy |
| 2016/0039059 A1 | 2/2016 | Takla |
| 2016/0171681 A1 | 6/2016 | Jeong |
| 2016/0229198 A1 | 8/2016 | Izume |

FOREIGN PATENT DOCUMENTS

| | | |
|---|---|---|
| FR | 2 940 172 A1 | 6/2010 |
| JP | 2-182388 | 7/1990 |
| JP | 6-170787 A | 6/1994 |
| JP | 11-229269 A | 8/1999 |
| JP | 2003-166165 A | 6/2003 |
| JP | 2007-112132 A | 5/2007 |
| JP | 2011-005579 A | 1/2011 |
| JP | 2011-167786 A | 9/2011 |

OTHER PUBLICATIONS

International Search Report issued in PCT/FR13/051558 dated Jan. 3, 2014.

Japanese Office Action issued in Japanese Patent Application No. 2015-522141 dated Apr. 11, 2017.

French Preliminary Search Report and Written Opinion issued in Patent Application No. 1256870 dated Apr. 11, 2013 (w/English Translation of Category of Cited Documents).

\* cited by examiner

METHOD AND SYSTEM FOR CUTTING A PREFORM INTENDED FOR THE PRODUCTION OF A TURBOMACHINE PART

CROSS-REFERENCE TO RELATED APPLICATIONS

This application is a continuation of U.S. application Ser. No. 14/414,772 filed Jan. 14, 2015, the entire contents of which is incorporated herein by reference. U.S. application Ser. No. 14/414,772 is a 371 of International Application No. PCT/FR13/051558 filed Jul. 2, 2013 and claims the benefit of priority from prior French Application No. 12 56870 filed Jul. 16, 2012.

GENERAL TECHNICAL FIELD

The invention relates to a cutting method of a preform, and a cutting system.

PRIOR ART

Some turbomachine parts, such as for example fan blades made of composite material can be made from a preform.

This preform comprises weaving a plurality of weaving threads or fibres which comprise warp threads and weft threads. These two groups of threads provide structural threads, ensuring the structure of the preform, and tracer threads visually identifiable from the others and arranged uniformly at least at the surface of the preform.

An example of the manufacture of such a preform is known from document EP 1526285.

The preform is cut out according to the form and dimensions of the parts constituting the blade, and is placed in a mould.

A binder comprising a heat-setting resin is then injected into the mould to impregnate the whole preform. After heating of the mould, the moulded piece is taken from the mould.

The cutting step of the preform requires cutting the preform according to a cutting contour, therefore the form corresponds to what is expected throughout manufacture.

Figure 1:
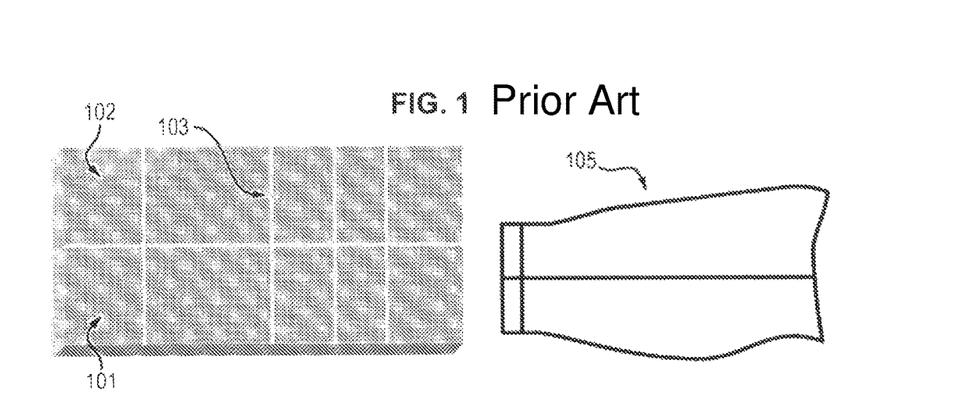
FIG. 1, already mentioned, is a representation of a preform and a cutting contour according to the prior art.

FIG. 1 illustrates a preform 101 comprising weaving threads distributed as warp threads and as weft threads. These weaving threads comprise structural threads 102 and visually identifiable threads 103.

A pre-calculated cutting contour 105 is also illustrated. This cutting contour 105 is calculated by supposing that the warp threads and the weft threads are arranged at 90° relative to each other.

At the cutting stage, the preform is not yet fixed, and is therefore malleable and deformable, resulting from the fact that the preform is only a mass of threads tangled by the weaving.

It is therefore necessary to verify that the preform is not deformed, that is, the warp threads and the weft threads exhibit a relative angle different of 90°.

Figure 2:
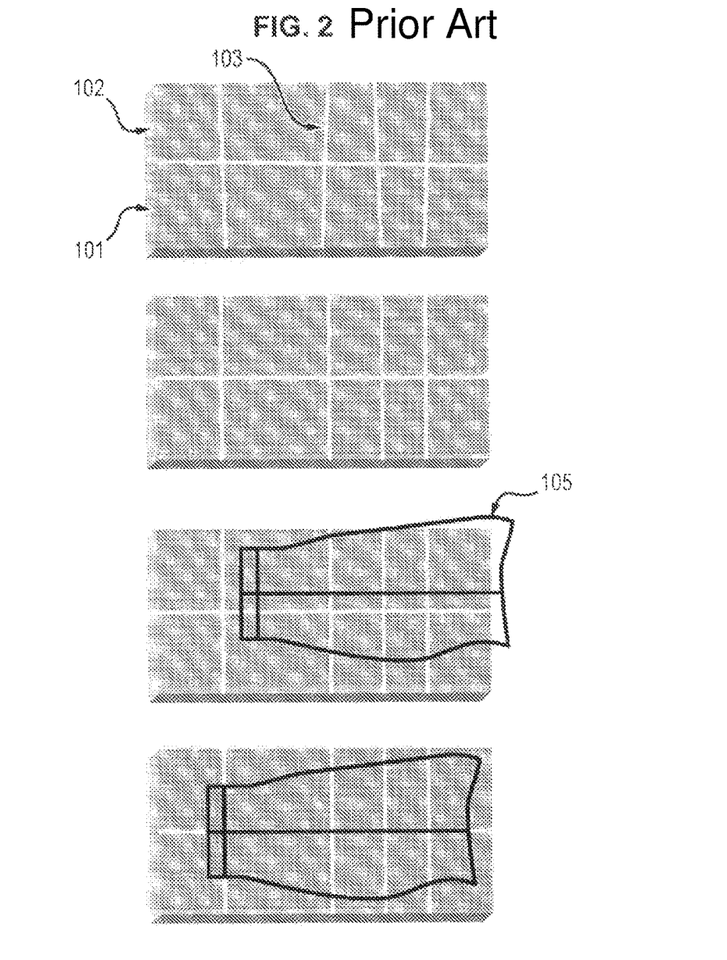
FIG. 2, already mentioned, is a representation of a cutting method according to the prior art.

In practice, an operator observes the visually identifiable threads to confirm whether such deformation is present. If this is the case, as is illustrated in FIG. 2, the warp threads and the weft threads are adjusted by the operator.

The following step consists of positioning the preform relative to the cutting machine. This operation is performed by an operator who positions the preform so that it is arranged at the level of a point of origin and cutting axes of the cutting machine.

This method and this cutting system have several disadvantages.

The verification step of the deformation of the preform is long and complicated, and this increases manufacturing time and boosts costs. There is also the risk of errors.

Also, the step for positioning the preform relative to the cutting machine increases manufacturing time and increases the risk of defects in the cutting.

PRESENTATION OF THE INVENTION

The invention proposes eliminating the above disadvantages.

For this purpose, the invention proposes a cutting method of a preform intended to produce a turbomachine part and comprising weaving a plurality of weaving threads, said weaving threads comprising visually identifiable threads, according to a cutting contour calculated from a preform model wherein the weaving threads present a reference layout, said method comprising the steps consisting of:
  taking an image of the preform,
  processing the image so as to determine deviation in the layout of the visually identifiable weaving threads relative to the reference layout,
  correcting the cutting contour as a function of said deviation,
  cutting the preform according to the corrected cutting contour.

In a cutting machine adjusted to make a cutting of the preform according to a cutting contour, the invention also comprises the steps consisting of:
  taking an image of the preform,
  processing the image so as to identify at least one point of reference in the weaving of the preform,
  from the identification of this point of reference, automatically correcting the position of the cutting machine relative to the preform to enable cutting of the preform according to the cutting contour, and
  cutting the preform according to the cutting contour.

According to an embodiment and in accordance with the embodiment just described, a first step consists of automatically correcting the positioning of the cutting machine relative to the preform, and a second step, in accordance with the embodiment previously described, consists of correcting the cutting contour as a function of deviation in the layout of the weaving threads.

In an application, the invention relates to for example a turbomachine blade, wherein a preform is cut out of this blade, characterized in that the cutting of this preform is carried out according to a method according to what has been described previously.

The invention has many advantages.

One advantage of the invention is to propose a solution improving the quality and precision of the cutting.

Another advantage of the invention is to propose a solution reducing manufacturing time, and which is less expensive.

Finally, another advantage of the invention is to increase standardisation of manufacture, which is made robust and repeatable.

PRESENTATION OF FIGURES

Other characteristics, aims and advantages of the invention will emerge from the following description, which is purely illustrative and non-limiting, and which must be considered in conjunction with the appended drawings, wherein.

DETAILED DESCRIPTION

Preform to be Cut Out

The preform 1 comprises weaving a plurality of weaving threads 9. The weaving threads 9 are generally divided into warp threads and weft threads.

Figure 3:
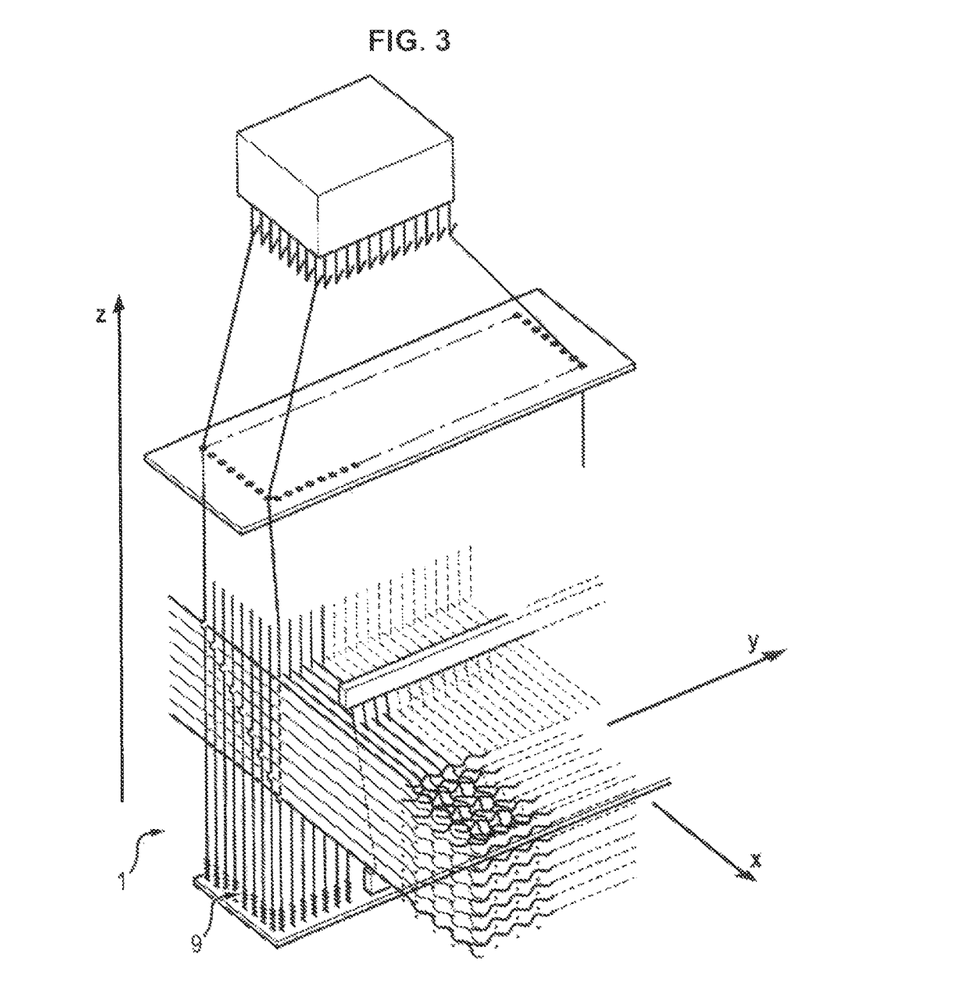
FIG. 3 is a representation of a preform in a loom.

FIG. 3 schematically shows a loom of Jacquard type on which are mounted warp threads oriented according to the longitudinal direction (arrow x), and which extend over several layers superposed according to the vertical direction (arrow z), and weft threads oriented according to the transversal direction (arrow y).

This type of weaving is known for example from document FR2861143. In an embodiment the weaving is three-dimensional.

The weaving threads 9 belong, for example, to the group formed by carbon fibres, glass fibres, silica fibres, silicon carbide fibres, aluminium fibres, aramid fibres and fibres of aromatic polyamides.

Figure 4:
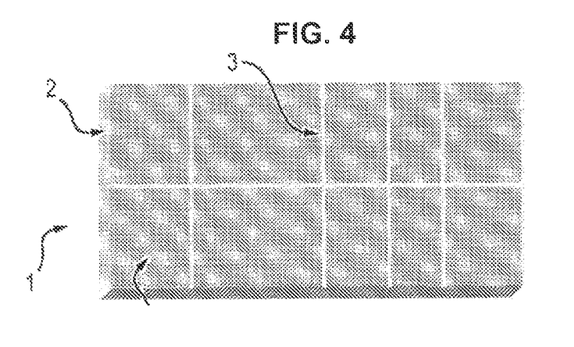
FIG. 4 is a representation of a preform 4 having weaving whereof the layout is a reference layout.

As illustrated schematically in FIG. 4, the weaving threads 9 comprise structural threads 2 used for weaving the structure of the preform, and visually identifiable threads 3.

The visually identifiable threads 3 are threads located essentially at the surface of the preform, and have a colour distinct from the structural threads 2, enabling their visual identification.

The threads 3 are arranged both as warp threads (longitudinal direction) and as weft threads (transversal direction).

In an embodiment, the structural threads 2 for three-dimensional weaving are carbon fibres, and the visually identifiable threads 3 are formed from glass fibres or Kevlar.

In this way, the visually identifiable threads 3 appear to be white in colour on the rest of the preform which is black, and are therefore visible.

Cutting System

Figure 5:
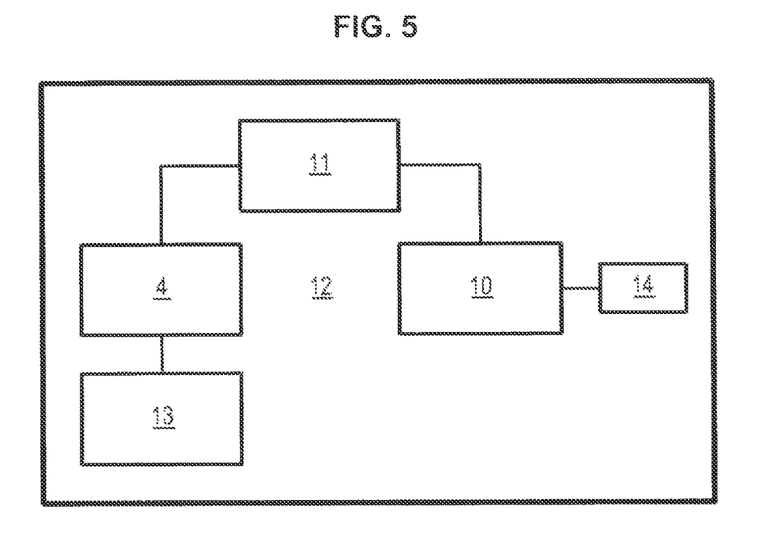
FIG. 5 is a representation of a system whereof the layout is reference.

Cutting the preform can be undertaken especially in a cutting system 12, schematically illustrated in FIG. 5.

The cutting system 12 comprises a cutting machine 4. Various cutting machine technologies can be used: water-jet cutting, and/or by mechanical means, and/or by laser cutting.

The cutting machine 4 conventionally comprises means for receiving and holding the preform to be cut out.

The cutting system 12 also comprises a memory 13, especially for storing a pre-calculated cutting contour, which will be used by the cutting machine 4.

The system 12 comprises an imaging device 10, configured to take one or more images. This imaging device 10 is for example of photo or camera type.

Finally, the cutting system 12 comprises a processing unit 11, configured to control the cutting machine and the imaging device to execute the embodiments of the methods for cutting described hereinbelow. The processing unit 11 is typically a processor associated with one or more processing programs.

If needed, the system 12 comprises display means, of screen type, and interaction means with an operator (keyboard, console, etc.).

Methods for Cutting

First Embodiment

The preform must be cut out. This cut is generally made by the cutting machine 4, in the cutting system 12.

The cutting machine 4 is conventionally adjusted to make a cutting according to a cutting contour 5. This contour is the contour of a bidimensional surface, but which will allow cutting of the preform, generally three-dimensional.

This cutting contour 5 is pre-calculated by simulation, as a function of the final form preferred for the structure intended for be constructed from the preform, and is recorded in the memory 13 of the cutting system 12.

This cutting contour 5 is especially pre-calculated from a preform model wherein the weaving threads exhibit a reference layout.

During simulations for calculating this contour, a preform model is used wherein the weaving threads have a reference layout. This reference layout corresponds to the threads being arranged according to a longitudinal axis of the preform (warp threads) and the threads arranged according to a transversal axis of the preform (weft threads) are arranged orthogonally relative to each other, as is for example illustrated in FIG. 1. In this reference layout, the visually identifiable threads 3 have no curve, but are rectilinear.

Since the preform 1 is deformable, this reference layout is not necessarily preserved for the time to proceed with the cutting step.

According to a first step, an image of the preform 1 is taken. This image is taken by the imaging device 10 of the cutting system. In general, this is an image comprising at least the upper surface of the preform 1.

It is possible for the imaging device 10 to take several images of the preform 1, though this is not obligatory.

In an embodiment, the imaging device 10 is completed by a lighting tool 14, oriented towards the preform, which improves quality and contrast of the image, for later processing.

The image is then processed so as to determine deviation in the layout of the weaving threads relative to the reference layout.

This processing is carried out by the processing unit 11 of the system 12, and/or by an external processing unit which communicates with the system 12 by any known communications means.

During processing, the image of the preform 1 is compared to a reference image (image of the preform model), wherein the weaving threads of the preform 1 present a reference layout.

In particular, the processing unit first identifies in the image the visually identifiable threads 3, by image processing. After identification of these threads 3, the layout of these threads 3 is determined by comparing the orientation of the threads 3 arranged mainly according to the longitudinal axis of the preform 1, with the threads 3 arranged mainly according to the transversal axis of the preform 1. This layout is then compared to the reference layout to determine the deviation in the layout.

Figure 6:
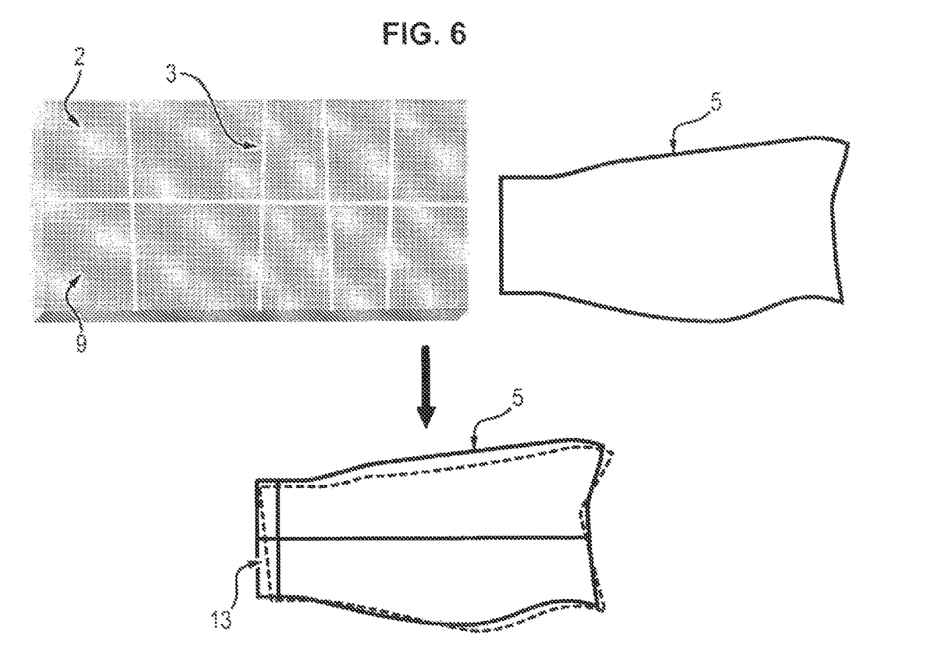
FIGS. 6 and 7 are representations of a first embodiment of a cutting method according to the invention.

For example, as illustrated in FIG. 6, the processing unit determines that the threads 3 arranged according to the transversal axis exhibit an angle with the threads 3 arranged according to the longitudinal axis different of 90°, which does not match the reference layout.

The deviation in the layout is for example characterized by a set of angles of deviation, for the visually identifiable threads 3.

The next step consists of correcting the cutting contour 5 as a function of said deviation.

As illustrated in FIG. 6, the cutting contour 5, pre-calculated and recorded in the memory 13, is corrected to give a corrected cutting contour 13, taking into account deformation of the preform 1.

In an embodiment, the corrected cutting contour 13 is calculated as follows.

The processing unit 11 superposes:
An image of the preform wherein the weaving threads 9 present a reference layout, and
The image of the preform taken by the imaging device 10.

The processing unit 11 compares the relative positions of the intersections of the visually identifiable threads 3 in the case of the image being taken by the device 10 with the relative positions of the intersections of the visually identifiable threads 3 in the reference layout.

Also, the processing unit 11 also compares:
the positions of the intersections between the visually identifiable threads 3 showing a reference layout and the cutting contour 5, with
the positions of the intersections between the visually identifiable threads 3 of the image taken and the cutting contour 5.

If the processing unit 11 detects the presence of gaps, the corrected cutting contour 5 is modified and smoothed according to the value of these gaps to give the cutting contour 13.

In an embodiment, which can be carried out in combination with the preceding embodiment if needed, the processing unit 11 determines, from the image of the preform, the curve of one or more visually identifiable threads 3. In fact, the threads are deformable and cannot be rectilinear.

The processing unit implements this curve in a calculation by finished elements, preadjusted in advance, which determines complete deviation of the preform relative to the reference layout. The curve of the threads 3 is especially compared to the theoretical curve of the reference layout.

The algorithm used is known from prior art, and is especially already used for calculation of the cutting contour 5 (this is for example the fishnet algorithm).

The calculation is of the order of 20 seconds.

Given that the threads are deformed, the contour is therefore deformed to adapt to this deformation.

Because of the corrected cutting contour 13, the same cutting results as if the preform had been adjusted manually by an operator prior to cutting.

In particular, the same relative positioning between the threads and the contour is obtained.

This engenders repeatability of the method, independent of the operator.

Figure 7:
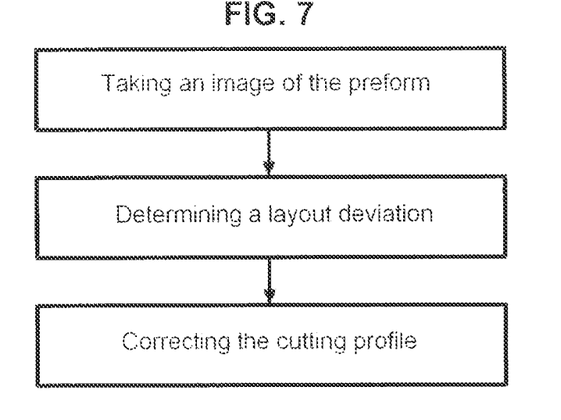

In a later step, the preform 1 is cut out according to the corrected cutting contour 13, as illustrated schematically in FIG. 7. This step is generally performed by a cutting machine 4. The processing unit 11 can for example control the cutting machine 4 so that it cuts out the preform according to this contour 13. Where appropriate, it can be carried out by manual cutting means on the basis of this corrected cutting contour 13.

Second Embodiment

Figure 8:
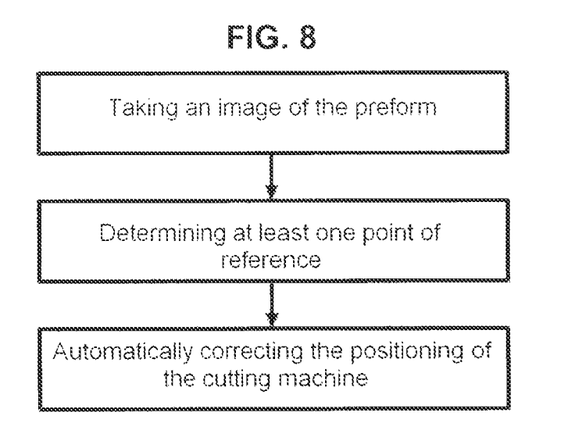
FIGS. 8 and 9 are a representation of a second embodiment of a cutting method according to the invention.

In this embodiment, the preform 1 must be cut out by the cutting machine 4, in the cutting system 12.

The cutting machine 4 is adjusted to make a cut of the preform 1 according to a pre-calculated cutting contour 5, for example of the type as described in the first embodiment.

As illustrated schematically in FIG. 8, a first step consists of taking an image of the preform 1 arranged in the cutting machine 4. This step is identical to the taking of an image described in reference to the first embodiment.

A second step consists of processing the image to determine at least one point 8 of reference in the weaving of the preform 1. The point 8 of reference is a point identifiable in the image, and corresponding to a point of reference in the weaving of the preform 1, for positioning purposes.

In an embodiment, the point 8 of reference corresponds to the intersection of visually identifiable threads 3.

This point 8 of reference is for example the intersection between a visually identifiable thread 3 according to the longitudinal axis of the preform, with a visually identifiable thread 3 according to the transversal axis of the preform. The visually identifiable thread 3 according to the transversal axis is, in an embodiment, the thread arranged to the side of an extremity of the preform 1.

Figure 9:
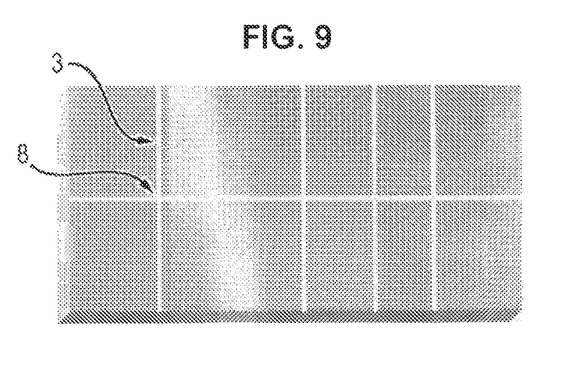

Once this point 8 of reference is identified, the cutting machine 4, under the control of the processing unit 11, automatically corrects its positioning relative to the preform 1 to enable cutting of the preform according to the pre-calculated cutting contour 5.

So the cutting machine 4 aligns its cutting axis with the preform 1, by way of identification of the point 8 of reference.

In an embodiment, the processing unit 11 compares the position of a point of reference of the machine 4, this point of reference being pre-recorded with the pre-calculated cutting contour 5, with the position of the point 8 of reference of the preform 1, which aligns the position of the preform 1 in the cutting machine 4 with the cutting contour 5 with which the machine 4 is adjusted to cut out the preform.

The relative positioning of the cutting machine 4 relative to the preform 1 is therefore done automatically without an operator needing to position the preform 1.

After automatic correction of the relative positioning of the cutting machine 4 relative to the preform 1, the preform 1 is cut out according to the pre-calculated cutting contour 5.

Third Embodiment

In this embodiment, the first and second embodiments are implemented.

The cutting machine 4 is adjusted to make a cutting of the preform 1 according to a pre-calculated cutting contour 5 from a preform model wherein the weaving threads 9 exhibit a reference layout.

After the preform 1 is placed in the cutting machine 4, an image of the preform 1 is taken by the imaging device 10.

A first step consists of automatically correcting the positioning of the cutting machine 4 relative to the preform 1.

This step is conducted in accordance with the second embodiment, wherein a reference point 8 of the preform 1 is identified in the image, allowing automatic correction of the relative positioning of the cutting machine 4 relative to the preform 1. In particular, a point of reference of the machine 4 is aligned with the point 8 of reference identified in the weaving of the preform 1.

The image of the preform 1 is also processed in accordance with the first embodiment to correct the pre-calculated cutting contour 5. Therefore, as explained hereinabove, deviation in the layout of the weaving threads 3 is determined relative to a reference layout to correct the cutting contour 5 as a function of said deviation.

In a later step, the machine 4 cuts out the preform 1 according to the corrected cutting contour 13.

In this embodiment, the steps enabling the cutting are automated, and the operator does not have to reposition the preform or correct the layout of the preform.

Examples of Manufacturing

In an application, one of the embodiments of the method is executed in a manufacturing method for a turbomachine blade.

The preform of this blade is cut out according to an embodiment of the method previously described so as to present the form and dimensions of the parts constituting the blade.

The preform is then placed in a mould.

As is known, a binder comprising a heat-setting resin is injected into the mould to impregnate the whole preform. After heating of the mould, the moulded piece is taken from the mould. The moulded piece is machined, giving it its definitive form, resulting in the blade.

The cutting method and the manufacturing method apply to different woven preforms, which are flat-woven and need cutting. These are for example the following pieces: fan blade (fan), fan platforms (fan), wedges (the wedge of the fan blade is a piece housed under the foot of the blade in the fan disc), the OGV (outlet guide vane), propellers, especially known as open rotor, and the various pieces used for technological tests.

In general, the proposed solution improves the quality and precision of the cutting. Also, the latter reduces manufacturing time, and is therefore less expensive.

Finally, automated processing of preforms heightens standardisation of manufacturing, which is made robust and repeatable.

The invention claimed is:

1. A cutting system of a preform comprising visually identifiable weaving threads, the preform being usable to produce a turbomachine part, the system comprising:
    a cutting machine of the preform;
    a memory, in which a reference preform image having a reference weaving thread layout and a pre-calculated cutting contour of the preform are recorded;
    an imaging device of the preform; and
    a processing unit, configured to control the cutting machine and the imaging device for execution of the following steps:
        taking an image of the preform;
        detecting intersections of the visually identifiable weaving threads in the taken image;
        superimposing the taken image and the reference preform image and calculating a deviation between the detected intersections and intersections of the reference weaving threads present in the reference preform image;
        correcting the cutting contour as a function of the deviation, and saving the corrected cutting contour in the memory; and
        cutting the preform according to the corrected cutting contour.

2. The system of claim 1, wherein the reference orientation is an orientation in which longitudinal threads are arranged orthogonally to transversal threads.

3. The system of claim 1, wherein the processing unit is further configured to determine a curve of one of the visually identifiable threads in the preform, and to compare the curve of the one of the visually identifiable threads in the preform to a theoretical curve of the reference layout to determine the deviation.

4. The system of claim 3, wherein the processing unit is further configured to implement a calculation by finished elements to determine the deviation of the preform relative to the reference orientation.

5. The system of claim 1, wherein the processing unit is further configured to calculate a corrected cutting contour taking into account the deviation, and to deform the corrected cutting contour according to a deformation of the visually identifiable threads, such that no manual adjustment by an operator is necessary prior to the cutting of the preform.

6. A cutting system of a preform comprising visually identifiable weaving threads, the preform being usable to produce a turbomachine part, the system comprising:
    a cutting machine of the preform;
    a memory, in which a pre-calculated cutting contour of the preform and a pre-recorded point of reference of the cutting machine are recorded;
    an imaging device of the preform; and
    a processing unit, configured to control the cutting machine and the imaging device for execution of the following steps:
        taking an image of the preform;
        detecting intersections of the visually identifiable weaving threads in the taken image;
        identifying at least one point of reference in the image of the preform, said at least one point of reference corresponding one of the intersections, and superimposing the pre-calculated cutting contour and the taken image to calculate a difference between a position of the pre-recorded point of reference of the cutting machine and a position of the point of reference of the preform;
        controlling the cutting machine so that the cutting machine aligns a point of reference of the cutting machine to the point of reference of the preform; and
        cutting the preform according to the cutting contour.

7. The system of claim 6, wherein the processing unit is further configured to control the cutting machine and the imaging device for execution of the following steps:
    processing the image of the preform to determine a deviation in a layout of the visually identifiable weaving threads relative to a reference layout;
    correcting the cutting contour as a function of the deviation, and saving the corrected cutting contour in the memory; and
    cutting the preform according to the corrected cutting contour.

8. The system of claim 2, wherein the deviation is characterized by a set of angles of deviation of the visually identifiable weaving threads.

9. The system of claim 6, wherein the point of reference in the weaving corresponds to an intersection between a longitudinal visually identifiable thread and a transversal visually identifiable thread arranged on a side of an extremity of the preform.

\* \* \* \* \*